US011763041B2

(12) United States Patent
Huang et al.

(10) Patent No.: US 11,763,041 B2
(45) Date of Patent: Sep. 19, 2023

(54) DATA STORAGE DEVICE PERFORMING IN-STORAGE PROCESSING

(71) Applicants: SK hynix Inc., Icheon (KR); The Board of Trustees of the University of Illinois, Urbana, IL (US)

(72) Inventors: Jian Huang, Champaign, IL (US); Xiaohao Wang, Santa Clara, CA (US); Luyi Kang, College Park, MD (US); Jong Ryool Kim, Icheon (KR); Hyung Jin Lim, Icheon (KR); Myeong Joon Kang, Icheon (KR); Chang Hwan Youn, Icheon (KR)

(73) Assignees: SK hynix Inc., Icheon (KR); The Board of Trustees of the University of Illinois, Urbana, IL (US)

( * ) Notice: Subject to any disclaimer, the term of this patent is extended or adjusted under 35 U.S.C. 154(b) by 266 days.

(21) Appl. No.: 17/243,165

(22) Filed: Apr. 28, 2021

(65) Prior Publication Data

US 2022/0350932 A1    Nov. 3, 2022

(51) Int. Cl.
*G06F 21/79* (2013.01)
*G06F 21/72* (2013.01)
*G06F 21/64* (2013.01)
*H04L 9/32* (2006.01)
*H04L 9/08* (2006.01)

(52) U.S. Cl.
CPC .............. *G06F 21/79* (2013.01); *G06F 21/64* (2013.01); *G06F 21/72* (2013.01); *H04L 9/0869* (2013.01); *H04L 9/3242* (2013.01)

(58) Field of Classification Search
None
See application file for complete search history.

(56) References Cited

U.S. PATENT DOCUMENTS

| | | |
|---|---|---|
| 2011/0208898 A1 | 8/2011 | Shin |
| 2015/0324132 A1 | 11/2015 | Chen et al. |
| 2017/0090800 A1* | 3/2017 | Alexandrovich ..... G06F 3/0637 |
| 2020/0133566 A1* | 4/2020 | Kim ..................... H04L 9/3247 |

(Continued)

FOREIGN PATENT DOCUMENTS

KR    20170033891 A    3/2017

OTHER PUBLICATIONS

N. Muralimanohar et al., "CACTI 6.0: A Tool to Model Large Caches," 2009, HP laboratories.

(Continued)

*Primary Examiner* — Benjamin E Lanier

(57) ABSTRACT

A data storage device includes a nonvolatile memory device, a volatile memory device, a data encryption circuit configured to encrypt data outputted from the nonvolatile memory device, a data decryption circuit configured to decrypt encrypted data output from the data encryption circuit and configured to provide the decrypted data to the volatile memory device, and a processor configured to perform a first process that controls installation of a first in-storage program in the data storage device, a second process configured to manage a mapping table storing a relation between a logical address and a physical address of the nonvolatile memory device, and a third process configured to execute the first in-storage program.

18 Claims, 11 Drawing Sheets

(56) References Cited

U.S. PATENT DOCUMENTS

2020/0192826 A1* 6/2020 Ben-Simon ......... G06F 12/1491
2020/0242258 A1* 7/2020 Smith .................. H04L 9/0894

OTHER PUBLICATIONS

C. Priebe et al., "Enclavedb: A secure database using sgx," in 2018 IEEE Symposium on Security and Privacy (Oakland'18), 2018.
J. Reardon et al., "Data node encrypted file system: Efficient secure deletion for flash memory," in Presented as part of the 21st USENIX Security Symposium (USENIX Security'12), 2012, Bellevue, WA.
B. Rogers et al., "Using address independent seed encryption and bonsai merkle trees to make secure processors os- and performance-friendly," in 40th Annual IEEE/ACM International Symposium on Microarchitecture (MICRO 2007), 2007, pp. 183-196, IEEE.
G. Saileshwar et al., "Morphable counters: Enabling compact integrity trees for low-overhead secure memories," in 2018 51st Annual IEEE/ACM International Symposium on Microarchitecture (MICRO), 2018, pp. 416-427, IEEE.
N. Santos et al., "Using arm trustzone to build a trusted language runtime for mobile applications," in Proceedings of the 19th International Conference on Architectural Support for Programming Languages and Operating Systems (ASPLOS'14), 2014.
F. Schuster et al., "Vc3: Trustworthy data analytics in the cloud using sgx," in 2015 IEEE Symposium on Security and Privacy (Oakland'15), 2015.
S. Seshadri et al., "Willow: A User-programmable SSD," in Proceedings of the 11th USENIX Conference on Operating Systems Design and Implementation (OSDI'14), 2014, Broomfield, CO.
A. Shilov, "Samsung to use sifive risc-v cores for socs, automotive, 5g applications," 2019, https://www.anandtech.com/show/15228/samsung-to-use-riscv-cores.
E. G. Sirer et al., "Logical attestation: An authorization architecture for trustworthy computing," in Proceedings of the Twenty-Third ACM Symposium on Operating Systems Principles (SOSP'11), 2011.
Software and L.-M.-U. M. Computational Systems Lab, "Cpu energy meter," 2020, pp. 126-133.
O. N. F. I. speeds at lower power consumption, "ONFI 4.0: Faster i/o speeds at lower power consumption," 2014.
Stavros Volos et al., "Graviton: Trusted Execution Environments on GPUs," in Proceedings of the 13th USENIX Symposium on Operating Systems Design and Implementation (OSDI'18), Oct. 2018, Carlsbad, CA.
M. Taassori et al., "Vault: Reducing paging overheads in sgx with efficient integrity verification structures," in Proceedings of the Twenty-Third International Conference on Architectural Support for Programming Languages and Operating Systems, 2018, pp. 665-678.
D. Tiwari et al., "Active flash: Towards energy-efficient, in-situ data analytics on extreme-scale machines," in Proceedings of the 11th USENIX Conference on File and Storage Technologies (FAST'13), 2013, San Jose, CA.
D. Tiwari et al., "Reducing Data Movement Costs Using Energy Efficient, Active Computation on SSD," in Proceedings of the 2012 USENIX Conference on Power-Aware Computing and Systems (HotPower'12), 2012, Hollywood, CA.
"The openssd project: Open-source solid-state drive project for research and education," H. University, 2020.
S. Weis, "Protecting Data In-Use from Firmware and Physical Attacks," Proceedings of Black Hat, 2014.
"Block cipher," Wikipedia, https://en.wikipedia.org/wiki/Block_cipher, 2020.
B. Wile, "Coherent Accelerator Processor Interface (CAPI) for POWER8 Systems," White Paper, Sep. 2014.
C. Yan et al., "Improving cost, performance, and security of memory encryption and authentication," ACM SIGARCH Computer Architecture News, 2006, pp. 179-190, vol. 34, No. 2.

X. Yang et al., "DNN Dataflow Choice is Overrated," 2018, arXiv preprint arXiv: 1809.04070.
J. Zhang et al., "The feniks fpga operating system for cloud computing," in Proceedings of the 8th Asia-Pacific Workshop on Systems (APSys'17), 2017.
W. Zheng et al., "Opaque: An oblivious and encrypted distributed analytics platform," in 14th USENIX Symposium on Networked Systems Design and Implementation (NSDI'17), Mar. 2017, Boston, MA.
"Scaleflux computational storage," https://www.scaleflux.com/, 2016.
"Amazon ec2 f1 instances: Enable faster fpga accelerator development and deployment in the cloud," https://aws.amazon.com/ec2/instance-types/f1/, 2018.
"Samsung smartssd," https://forums.xilinx.com/t5/Xilinx-Xclusive-Blog/Samsung-Electronics-Unveils-Xilinx-Based-SmartSSD-Solution/ba-p/902137, 2018.
"Intel software guard extensions," https://software.intel.com/en-us/sgx, 2020.
"Tpm 2.0 library specification," https://trustedcomputinggroup.org/resource/tpm-library-specification/, 2020.
A. Ahmad et al., "Obliviate: A data oblivious filesystem for intel sgx," in NDS'18, 2018.
Anandtech, "Memblaz's pblaze5 x26: Toshib's xl-flash-based ultra-low latency ssd," 2019.
"Arm1156t2f-s technical reference manual," ARM, 2007.
"Arm corelink tzc-400 trustzone address space controller," Arm, http://infocenter.arm.com/help/topic/com.arm.doc.ddi0504c/DDI0504C_tzc400_r0p1_trm.pdf, 2013.
"Arm architecture reference manual for armv8-a," ARM, 2020.
"Arm trustzone technology," Arm, https://developer.arm.com/ip-products/security-ip/trustzone, 2020.
S. Arnautov et al., "SCONE: Secure linux containers with intel SGX," in 12th USENIX Symposium on Operating Systems Design and Implementation (OSD'16), Savannah, GA, Nov. 2016.
A. Awad et al., "Triad-nvm: Persistency for integrity-protected and encrypted non-volatile memories," in Proceedings of the 46th International Symposium on Computer Architecture, 2019, pp. 104-115.
R. Balasubramonian et al., "Near-data processing: Insights from a micro-46 workshop," IEEE Micro, vol. 34, No. 4, 2014.
R. Balasubramonian et al., "Near-data processing: Insights from a micro-46 workshop," IEEE Computer Society, 2014.
S. Banik and T. Isobe, "Triad v 1—a lightweight aead and hash function based on stream cipher cover sheet," 2019.
A. Baumann et al., "Shielding applications from an untrusted cloud with haven," in 11th USENIX Symposium on Operating Systems Design and Implementation (OSDI'14), Broomfield, CO, Oct. 2014.
M. Bjørling et al, "LightNVM: The Linux Open-Channel SSD Subsystem," in Proceedings of the 15th USENIX Conference on File and Storage Technologies (FAST'17), Santa Clara, CA, 2017.
S. Boboila et al, "Active Flash: Out-of-core Data Analytics on Flash Storage," in Proceedings of the IEEE 28th Symposium on Mass Storage Systems and Technologies (MSST'12), Monterey, CA, Apr. 2012.
F. Brasser et al., "Sanctuary: Arming trustzone with user-space enclaves," in Proceedings of the 2019 Network and Distributed Systems Security Symposium (NDSS'19), San Diego, CA, 2019.
W. Cao, Y. Liu et al., "POLARDB meets computational storage: Efficiently support analytical workloads in cloud-native relational database," in 18th USENIX Conference on File and Storage Technologies (FAST'20), Santa Clara, CA, Feb. 2020.
N. Chatterjee et al., "Usimm: the utah simulated memory module," University of Utah, Tech. Rep, 2012.
R. Cheerla, "Computational ssds," Storage Networking Industry Association, 2019.
F. Chen, R. Lee, and X. Zhang, "Essential roles of exploiting internal parallelism of flash memory based solid state drives in high-speed data processing," in Proceedings of the 17th IEEE International Symposium on High Performance Computer Architecture (HPCA'11), 2011.
B. Y. Cho et al,, "XSD: Accelerating MapReduce by Harnessing the GPU inside an SSD," in Proceedings of the 1st Workshop on

(56) References Cited

OTHER PUBLICATIONS

Near-Data Processing in Conjunction with the 46th IEEE/ACM International Symposium on Microarchitecture (WoNDP), Davis, CA, Dec. 2013.

A. Dave et al., "Oblivious coopetive analytics using hardware enclaves," in Proceedings of European Conference on Computer Systems (EuroSys'20), Crete, Greece, Mar. 2020.

C. De Canniere and B. Preneel, "Trivium specifications," in eSTREAM, ECRYPT Stream Cipher Project, 2005.

W. Digital, "Risc-v: Accelerating next-generation compute requirements," https://www.westerndigital.com/company/innovations/risc-v, 2019.

J. Do et al., "Query Processing on Smart SSDs: Opportunities and Challenges," in Proceedings of the ACM SIGMOD International Conference on Management of Data (SIGMOD'13), New York, NY, 2013.

J. Do et al., "Query processing on smart ssds: Opportunities and challenges," in Proceedings of the 2013 ACM SIGMOD International Conference on Management of Data (SIGMOD'13), New York, NY, USA, 2013.

R.-V. Foundation,"The risc-v instruction set manual," https://content.riscv.org/wp-content/uploads/2017/05/riscv-privileged-v1.10.pdf, 2017.

Gem5 development team, "gem5 simulator," 2020.

D. Gouk et al., "Amber*: Enabling precise full-system simulation with detailed modeling of all ssd resources," in 2018 51st Annual IEEE/ACM International Symposium on Microarchitecture (MICRO). IEEE, 2018, pp. 469-481.

B. Gu et al., "Biscuit: A framework for near-data processing of big data workloads," in 2016 ACM/IEEE 43rd Annual International Symposium on Computer Architecture (ISCA'16), Seoul, Korea, Jun. 2016.

A. Gupta et al., "DFTL: A Flash Translation Layer Employing Demand-based Selective Caching of Page-level Address Mappings," in Proceedings of the 14th International Conference on Architectural Support for Programming Languages and Operating Systems (ASPLOS'09), Washington, DC, USA, 2009.

G. Halfacree, "Sifiv's risc-v cores launch in two ssd families," https://www.bit-tech.net/news/tech/storage/sifives-risc-v-cores-launch-in-two-ssd-families/1/, 2018.

Z. Hua et al., "vtz: Virtualizing ARM trustzone," in 26th USENIX Security Symposium (USENIX Securit 17), Vancouver, BC, Aug. 2017.

J. Huang et al., "FlashBlox: Achieving Both Performance Isolation and Uniform Lifetime for Virtualized SSDs," in Proceedings of the 15th Usenix Conference on File and Storage Technologies (FAST'17), Santa clara, CA, 2017.

"Running average power limit," Intel, 2014.

S. Jun et al., "GraFBoost: Using Accelerated Flash Storage for External Graph Analytics," in Proceedings of the 45th Annual International Symposium on Computer Architecture (ISCA'18), Los Angeles, CA, Jun. 2018.

Y. Kang et al., "Enabling cost-effective data processing with smart SSD," in Proceedings of the 28th IEEE Conference an Mass Storage Systems and Technologies (MSST'13), Lake Arrowhead, CA, May 2013.

A. Khawaja et al., "Sharing, protection, and compatibility for reconfigurable fabric with amorphos," in 13th USENIX Symposium on Operating Systems Design and Implementation (OSDI 18), Carlsbad, CA, Oct. 2018.

G. Koo et al., "Summarizer: Trading communication with computing near storage," in Proceedings of the 50th Annual IEEE/ACM International Symposium on Microarchitecture (MICRO'17), Cambridge, Massachusetts, 2017.

G. Koo et al., "Summarizer: Trading communication with computing near storage," in Proceedings of the 50th Annual IEEE/ACM International Symposium on Microarchitecture (MICRO'17), Boston, MA, 2017.

V. S. Mailthoday et al., "DeepStore: In-Storage Acceleration for Intelligent Queries," in Proceedings of the 52nd IEEE/ACM International Symposium on Microarchitecture (MICRO'19), Columbus, OH, Oct. 2019.

K. K. Matam et al., "GraphSSD: Graph Semantics Aware SSD," in Proceedings of the 46th Annual International Symposium on Computer Architecture (ISCA'19), Phoenix, AZ, 2019.

J. M. McCune et al., "Trustvisor: Efficient tcb reduction and attestation," in 2010 IEEE Symposium on Security and Privacy (Oakland'10), 2010.

J. M. McCune et al., "Flicker: An execution infrastructure for tcb minimization," in Proceedings of the 3rd ACM SIGOPS/EuroSys European Conference on Computer Systems (EuroSys'08), 2008.

D. McIntyre, "Fpgas in flash controller applications," 2017.

"Micron 3d nand flash memory," Micron, 2019.

\* cited by examiner

FIG. 4

| Memory Space | Access Right | |
|---|---|---|
| | Normal | Secure |
| Normal | R/W | R/W |
| Protected | R | R/W |
| Secure | No Access | R/W |

FIG. 6

| ID | Logical Address | Physical Address |
|---|---|---|
|  |  |  |
|  |  |  |
|  |  |  |
| #1 |  |  |
| #1 |  |  |
|  |  |  |
| #2 |  |  |
| #2 |  |  |

510

DATA STORAGE DEVICE PERFORMING IN-STORAGE PROCESSING

BACKGROUND

1. Technical Field

Various embodiments generally relate to a data storage device for performing in-storage processing, and more particularly, to a data storage device for performing in-storage processing with improved security performance.

2. Related Art

In a conventional data storage device that performs in-storage processing, application code provided from a host is stored in the data storage device, and the application code accesses memory space to perform in-storage processing.

However, a conventional data storage device has insufficient security functions, and thus a security threat may occur when a malicious code is included in the application code.

For example, when multiple in-storage programs are installed in one data storage device, malicious code included in one in-storage program may attack other in-storage programs.

In addition, there is a risk of directly stealing user data through physical hacking techniques, and in the case of flash-based data storage devices, operation of the system can be disrupted by attacking a Flash Translation Layer (FTL) that performs garbage collection or wear leveling.

Accordingly, there is a need for a data storage device that removes security threats and safely performs in-storage processing.

SUMMARY

In accordance with an embodiment of the present disclosure, a data storage device may include a nonvolatile memory device; a volatile memory device; a data encryption circuit configured to encrypt data output from the nonvolatile memory device; a data decryption circuit configured to decrypt encrypted data outputted from the data encryption circuit and configured to provide the decrypted data to the volatile memory device; and a processor configured to perform a first process that controls installation of a first in-storage program in the data storage device, a second process configured to manage a mapping table storing a relation between a logical address and a physical address of the nonvolatile memory device, and a third process configured to execute the first in-storage program. In accordance with an embodiment of the present disclosure, a method performed by a data storage device in communication with a host computing device, the data storage device comprising a flash chip, a dynamic random access memory (DRAM) chip, an encryption circuit, an internal bus, a processor, and a decryption circuit, wherein the method is performed by the processor and includes executing an in-storage program stored in the data storage device, the in-storage program having plain data stored in the flash chip; when execution of the in-storage program causes the plain data to be stored in the DRAM chip, as the plain data flows out of the DRAM chip, encrypting, by the encryption circuit, the plain data to produce corresponding encrypted data; transferring, via the internal bus, the encrypted data from the encryption circuit to the decryption circuit; decrypting, by the decryption circuit, the encrypted data to reproduce the plain data; and storing the plain data in the DRAM chip.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate various embodiments, and explain various principles and beneficial aspects of those embodiments.

FIG. 4 illustrates relation between access right and memory space according to an embodiment of the present disclosure.

FIG. 6 illustrates a mapping table according to an embodiment of the present disclosure.

DETAILED DESCRIPTION

The following detailed description references the accompanying figures in describing illustrative embodiments consistent with this disclosure. The embodiments are provided for illustrative purposes and are not exhaustive. Additional embodiments not explicitly illustrated or described and modifications are possible. The detailed description is not meant to limit this disclosure. Rather, the scope of the present disclosure is defined in accordance with claims and equivalents thereof. Also, throughout the specification, reference to "an embodiment" or the like is not necessarily to only one embodiment, and different references to any such phrase are not necessarily to the same embodiment(s).

Figure 1:
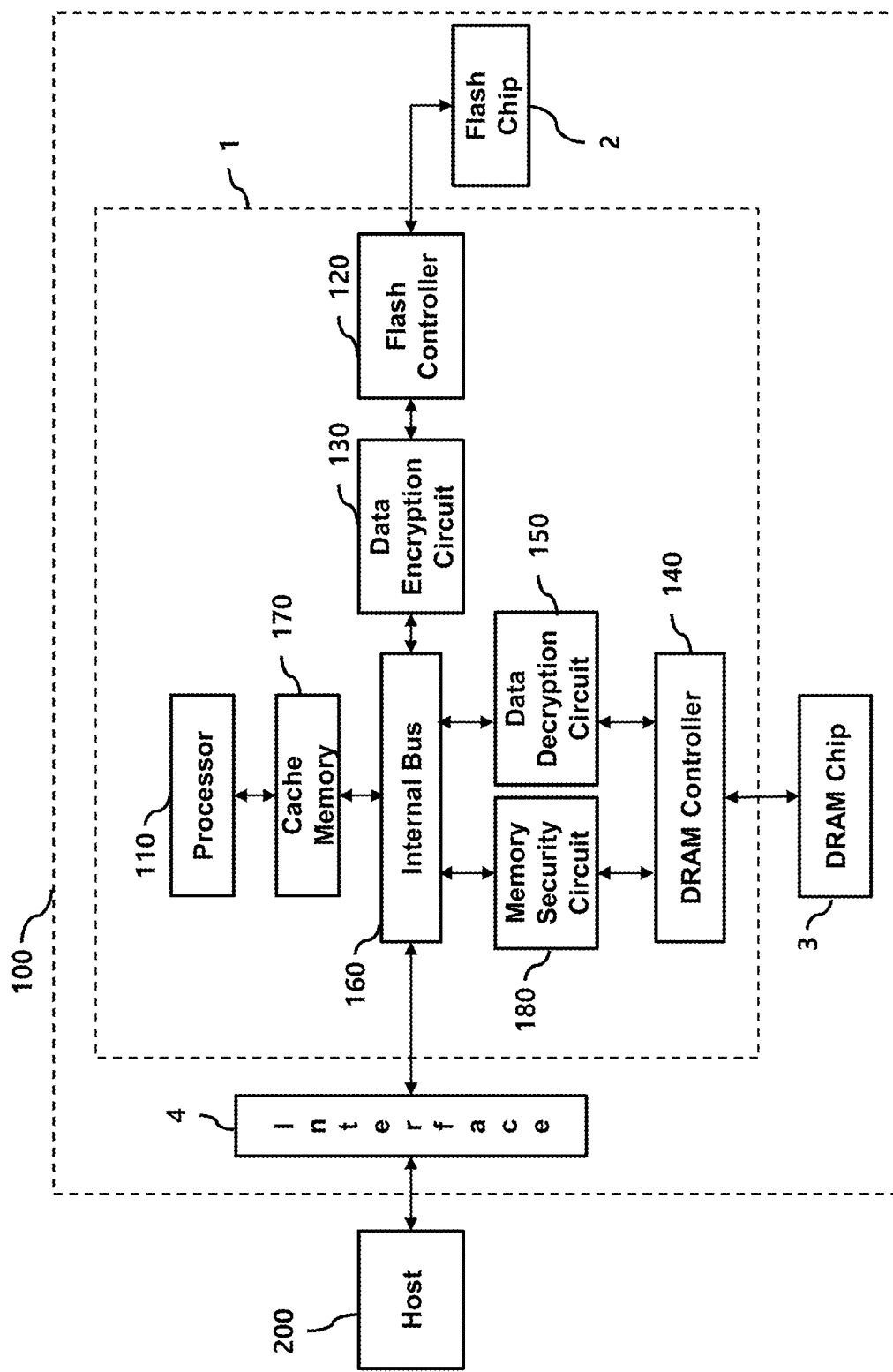
FIG. 1 illustrates a data storage device according to an embodiment of the present disclosure.

FIG. 1 illustrates a data storage device 100 according to an embodiment of the present disclosure.

The data storage device 100 may read or write data according to the request from a host 200. The host 200 may be any of a variety of computing devices, e.g., a server, a mobile device, a laptop computer, or any other general-purpose computing device having a processor, memory, and the like.

The data storage device 100 may install one or more in-storage programs provided by the host 200, and perform in-storage processing according to the installed in-storage programs.

Hereinafter, the data storage device 100 is disclosed by taking a solid state drive (SSD) including a flash memory as an example, but is not limited thereto.

In this embodiment, the data storage device 100 includes a control circuit 1, a flash chip 2, a DRAM chip 3, and an interface 4 (as used herein, "chip" of a given type refers to one or more chips of the given type).

The flash chip 2 is an example of a nonvolatile memory device, and the DRAM chip 3 is an example of a volatile memory device.

The host 200 provides signals such as command, address, and data to the data storage device 100 through the interface 4.

In addition to general data read/write commands, the host 200 may provide a command to install an in-storage program, a command to execute an in-storage program, and a command to delete an in-storage program to the data storage device 100.

The control circuit 1 controls the overall operation of the data storage device 100 and may be implemented through hardware, software, or a combination of hardware and software.

The control circuit 1 includes a processor 110, a flash controller 120, a DRAM controller 140, and an internal bus 160.

The control circuit 1 further includes a data encryption circuit 130 for encrypting data output from the flash chip 2, and a data decryption circuit 150 for decrypting an encrypted data and providing a decrypted data to the DRAM chip 3.

The control circuit 1 may further include a cache memory 170 coupled to the processor 110 to cache data provided from the DRAM chip 3.

The control circuit 1 may further include a memory security circuit 180 that manages security of data used during the operation of the processor 110.

In this embodiment, the processor 110 may control various operations of the control circuit 1 according to firmware.

The firmware may be stored in a ROM or other storage device inside or outside the processor 110. A technology for storing firmware in an external or internal storage device of the processor 110 is well known, so a detailed description thereof will be omitted.

In general, the processor 110 may include a memory management unit (MMU) and a translation lookaside buffer (TLB) therein.

In this embodiment, the processor 110 may perform an operation of converting a virtual address to a physical address and controlling memory access through the MMU, and temporarily stores information used for the operation of the memory management unit in the TLB.

In this embodiment, when an unauthorized memory area is accessed while an in-storage program is running, the MMU may generate a fault signal by referring to the storage security library 311, thereby preventing the memory access of the in-storage program.

The flash controller 120 is coupled to the flash chip 2 through a channel and stores data in the flash chip 2 or reads data from the flash chip 2 according to a command provided from the processor 110. Hereinafter, the flash controller 130 may be referred to as a first controller 130

The DRAM chip 3 may store in-storage program provided by the host 100, metadata corresponding to the in-storage program, data used by the in-storage program, mapping table 510, and data provided from the flash chip 2.

The DRAM controller 140 controls an operation of reading data from the DRAM chip 3 or writing data to the DRAM chip 3. Hereinafter, the DRAM controller 140 may be referred to as a second controller 130

The data encryption circuit 130 may encrypt data output from the flash chip 2.

The data decryption circuit 150 may decrypt data provided to the DRAM chip 2. For example, encrypted data provided by the data encryption circuit 130 may be decrypted by the data decryption circuit 150 and provided to the DRAM chip 2.

The data encryption circuit 130 and the data decryption circuit 150 enhance security performance of the data storage device 100 by encrypting and decrypting, respectively, data flowing from the flash chip 2 to the DRAM chip 3.

The internal bus 160 transmits signals such as commands, address, and data among the processor 110, the data encryption circuit 130, the data decryption circuit 150, the memory security circuit 180, and the interface 4.

The memory security circuit 180 controls an encryption operation and a data verification operation of data stored in the DRAM chip 3 in order to prevent leakage of data related to the execution of the in-storage program.

Figure 2:
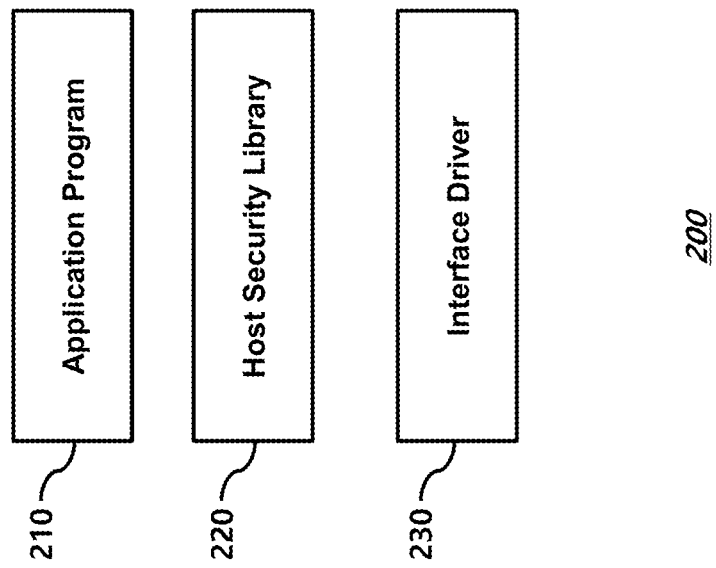
FIG. 2 illustrates functions of a host coupled to a data storage device according to an embodiment of the present disclosure.

FIG. 2 illustrates functions of a host 200 coupled to the data storage device 100 according to an embodiment of the present disclosure.

The host 200 may be implemented as a computer device driven by an operating system but is not limited thereto.

The host 200 may include an application program 210, a host security library 220, and an interface driver 230.

The host security library 220 may be implemented with hardware, software, or a combination thereof.

The application program 210 may control operations such as providing a simple read or write request to the data storage device 200 or installing an in-storage program inside the data storage device 200.

More specifically, the application program 210 may install an in- storage program in the data storage device 210 and receive an execution result of the in-storage program.

The host security library 220 provides an application program interface (API) related to controlling operations, such as installing an in- storage program in the data storage device 100 and receiving a result thereof.

The application program 210 may execute various operations related to the in-storage program using APIs provided by the host security library 220.

Table 1 shows APIs supported by the host security library 220.

TABLE 1

| API | Description |
| --- | --- |
| OffloadCode(char* bin, uint* Ipa, void* args, uint tid) | Invokes an offloading procedure specified by tid. |
| GetResult(uint tid, uint64_t* res) | Retrieve results from the offloaded program specified by tid. |

The host security library 220 may operate together with the storage security library 311 of the data storage device 100 to support an in-storage processing, which will be described below.

The interface driver 230 is an interface-related driver between the data storage device 100 and the host 200, and may control an interface operation according to, for example, a Non-Volatile Memory Express (NVMe) standard.

Figure 3:
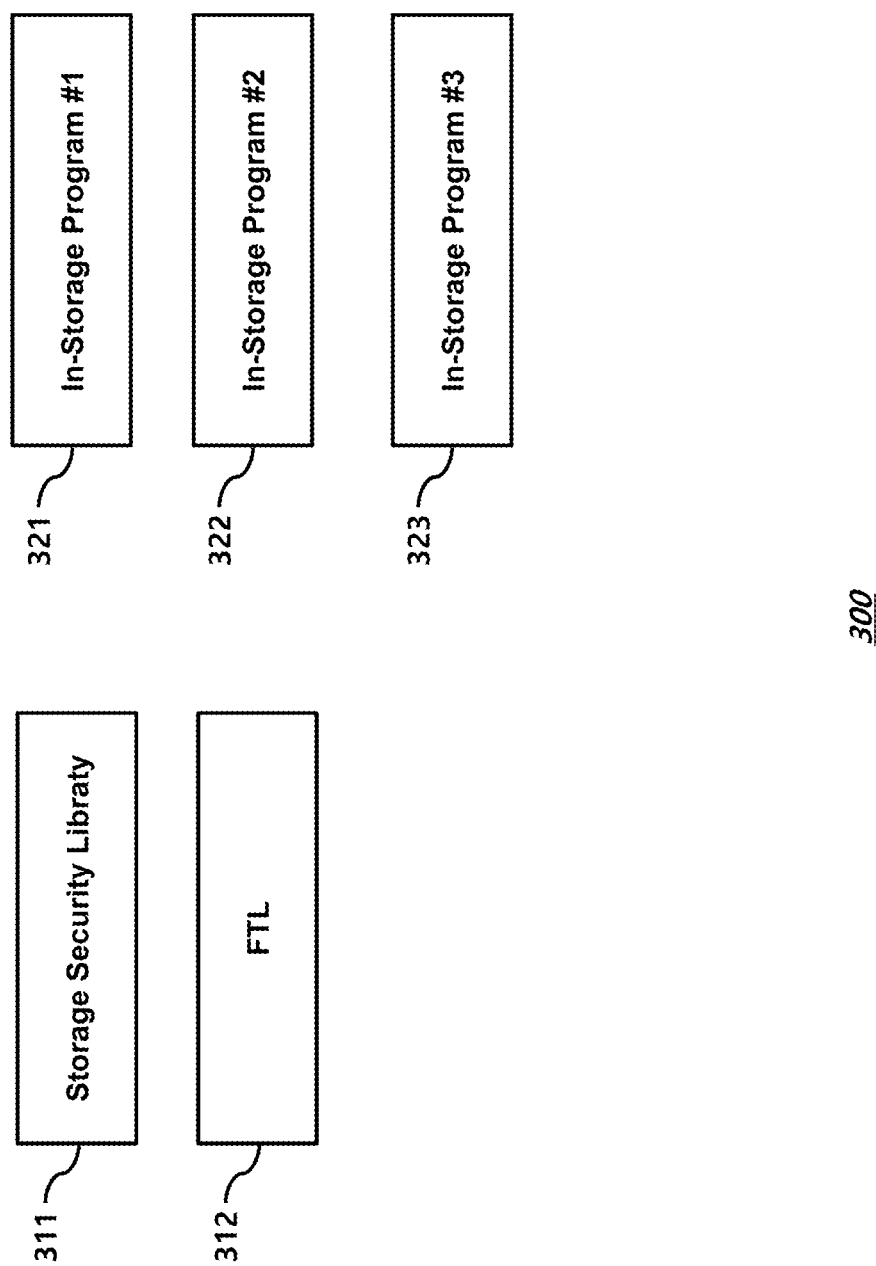
FIG. 3 illustrates functions of a data storage device according to an embodiment of the present disclosure.

FIG. 3 illustrates functions of the data storage device 100 according to an embodiment of the present disclosure.

Each block of FIG. 3 may be implemented with software included in the firmware executed by the processor 110, but is not limited thereto, and may be implemented by hardware or a combination of software and hardware.

The data storage device 100 may store a storage security library 311, a Flash Translation Layer (FTL) 312, and one or more in-storage programs 321 to 323.

The storage security library 311 manages in-storage programs and in-storage processing operations; some of the in-storage processing operations cooperate with the host security library 220.

When a function of the storage security library 311 is invoked and then executed by the processor 110, the process will be referred to herein as a first process.

The FTL 312 controls operations associated with the flash chip 2, for example read/write operations using the flash chip 2, garbage collection, wear leveling, and mapping table management. These operations are well known and a detailed description thereof is omitted.

When a function of the FTL 312 is invoked and executed, by the processor 110, the process will be referred to herein as a second process.

In the present embodiment, the storage security library 311 library supports the security-related in-storage processing in the data storage device 100, but is not limited thereto.

In this embodiment, the storage security library 311 supports in-storage processing by providing an API as shown in Table 2 below.

TABLE 2

| API | Description |
|---|---|
| CreateEnclave (void* config, id_t &eid, enclave_t* enclave) | Initiates an enclave and copies specified code into enclave. |
| SetIDBits (const id_t &eid, uint64_t* Ipns) | Set ID bits of the corresponding address mapping table entries. |
| TerminateEnclave (enclave_t* enclave) | Terminates the specified enclave, and reclaims resources. |
| ThrowOutEnclave (enclave_t* enclave, STEE_MSG* sm) | Abort the execution of the enclave, and return an exception. |
| ReadMappingEntry (id_t &eid, uint64_t* Ipa, uint64_t* ppa) | Requests FTL to return the corresponding physical address. |

The storage security library 311 may store program codes by installing an in-storage program or by allocating an enclave, which is a memory area that can be used by the in-storage program.

The storage security library 311 may designate an ID for a corresponding in-storage program and store the ID in an entry of a mapping table 510 (discussed below with reference to FIG. 5).

The storage security library 311 may also control the initializing of an in-storage program in the data storage device 100 and may manage metadata for an in-storage program.

For example, a code for identifying an in-storage program or a communication key thereof may be included in the in-storage program's metadata.

There is a risk that an in-storage program will not operate normally if malicious code included in the in-storage program changes the in-storage program's metadata.

In this embodiment, security may be improved by preventing an in-storage program from accessing a memory area (e.g., in DRAM chip 3) used by the storage security library 311.

In this embodiment, security may be further improved by preventing an in-storage program from accessing a memory area used by another in-storage program without proper access right.

Figure 5:
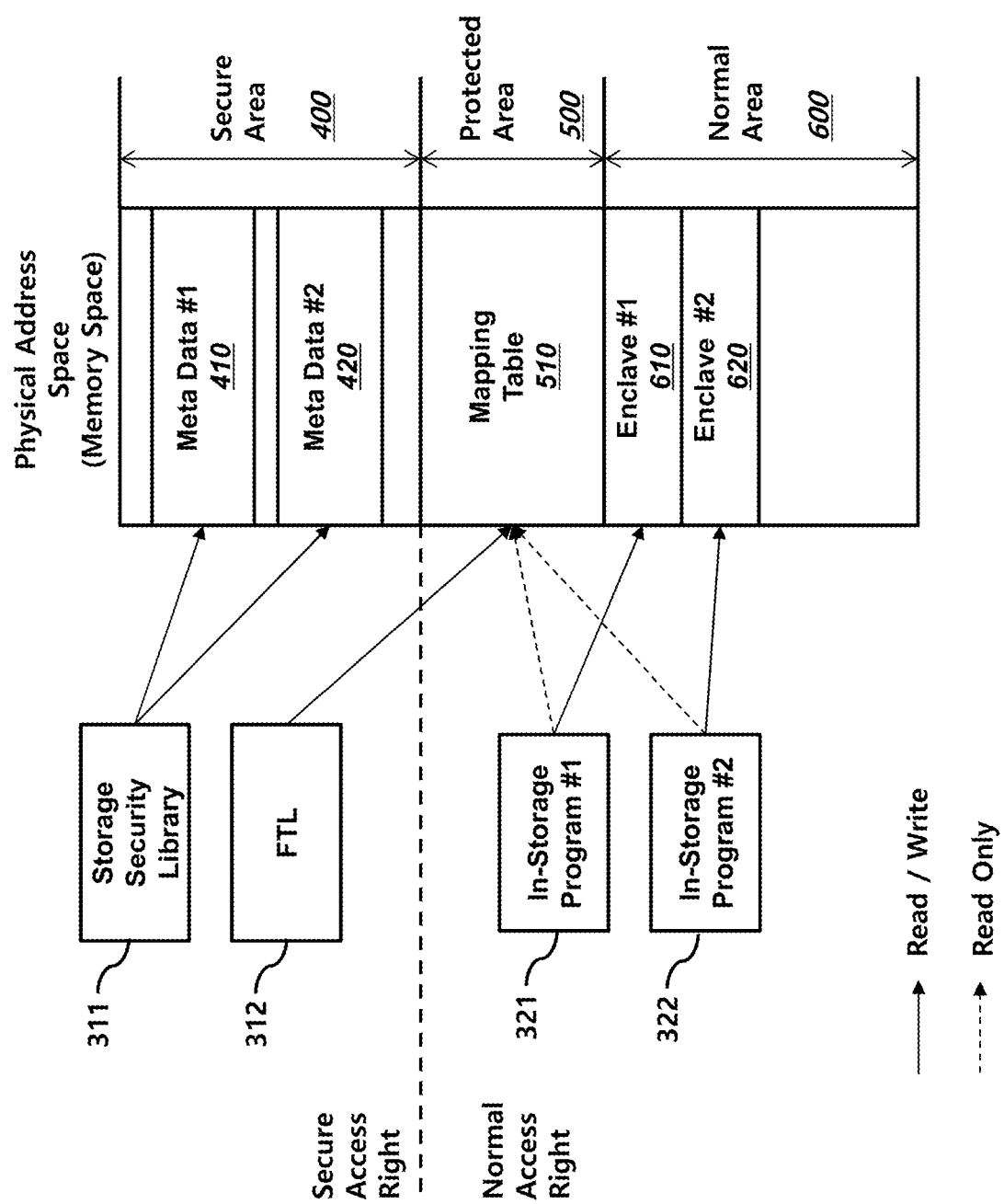
FIG. 5 illustrates an operation of a data storage device according to an embodiment of the present disclosure.

In this embodiment, as shown in FIG. 5, the storage security library 311 and the FTL 312 have a secure access right to the memory area(s), and the in-storage programs 321 to 323 have normal access right to the memory area(s).

In this embodiment, the memory space includes a normal area 400, a protected area 500, and a secure area 600 (in one embodiment, only the metadata areas are secure, and in another only the mapping area is protected).

The memory space may correspond to memory of the DRAM chip 2. The storage security library 311, FTL 312, and a plurality of in-storage programs may be stored in the memory space.

FIG. 4 illustrates types of access rights for categories of memory in the memory space according to an embodiment of the present disclosure.

In the case of an element of a process having the normal access right, such as an in-storage program, privileges include: both read and write operations are possible for a normal area, only read operations are allowed for a protected area, and no access (no read or right operations) is allowed for a secure area.

In the case of an element or a process having the secure access right, such as the storage security library 311 and FTL 312, privileges include: read and write operations are possible for a normal area, a protected area, and a secure area.

FIG. 5 illustrates an operation of the data storage device 100 according to an embodiment of the present disclosure.

A physical address space, that is, a memory space of the DRAM chip 2 includes the secure area 400, the protected area 500, and the normal area 600.

Metadata 410 and 420 corresponding to the in-storage programs 321 and 322 are stored in the security area 400.

Metadata 410 and 420 includes identification numbers IDs of the in-storage programs 321 and 322, addresses in which the in-storage programs 321 and 322 are stored, and communication keys used by the in-storage programs 321 and 322 for communication.

The metadata 410 and 420 of the in-storage programs 321 and 322 may be managed by the storage security library 311.

In FIG. 5, solid arrows indicate that read and write operations are possible, and dotted arrows indicate that only read operations are possible.

The mapping table 510 is stored in the protected area 500. The mapping table 510 is a structure for managing a relationship between a logical address and a physical address of the flash chip 2 and may be managed by the FTL 312.

In the example shown in FIG. 5, the in-storage programs 321 and 322 can access the data of the flash chip 2, but when the mapping table 510 is stored in the secure area 400, the in-storage programs 321 and 322 cannot access the mapping table 510.

A process related to the execution of the in-storage program 321 will be referred to herein as a third process, and a process related to the execution of the in-storage program 322 will be referred to as a fourth process.

In this case, the in-storage programs 321 and 322 usually required to acquire a physical address through the FTL 312 before accessing the flash chip 2, which increases processing time of the in-storage programs 321 and 322 and degrades performance.

In this embodiment, the mapping table 510 is stored in the protected area 500 and the in-storage programs 321 and 322 may access the protected area 500 in a read-only manner, which reduces performance degradation of the in-storage programs 321 and 322.

However, because the in-storage programs 321 and 322 have only the normal access right those in-storage programs cannot perform a write operation on the protected area 500 and data in the mapping table 510 can be prevented from being damaged by the in-storage programs 321 and 322.

In-storage programs 321 and 322 cannot access the secure area 400, for example, read operations are impossible.

The normal area 600 includes a number of enclaves 610 and 620. An enclave corresponds to a memory area or partition in which instructions (e.g. code or call stack data) of a corresponding in-storage program are installed or to a memory area used for the execution of a corresponding in-storage program (e.g. heap data).

Hereinafter, the enclave 610 will be referred to as a first enclave 610, and the enclave 620 will be referred to as a second enclave 620.

In the present embodiment, the in-storage programs 321 and 322 can access the normal area 600, but cannot access all enclaves 610 and 620. For example, the in-storage program 321 can access the enclave 610 but cannot access the enclave 620 and the in-storage program 322 can access the enclave 620 but cannot access the enclave 610.

This eliminates the risk of data damage by one in-storage program accessing an enclave that corresponds to another in-storage program.

When an in-storage program accesses an enclave allocated to another in-storage program, the memory MMU may generate a fault with a call to the storage security library 311.

For example, when a third process related to the in-storage program 321 accesses the second enclave 620 or a fourth process related to the in-storage program 322 accesses the first enclave 610, the MMU may generate a fault signal, and accordingly, the operation of the in-storage program may be blocked or terminated.

Securing the mapping table 510 may prevent an in-storage program from accessing a physical page of the flash chip 2 that has been allocated to another in-storage program.

FIG. 6 shows a data structure of the mapping table 510 according to an embodiment of the present disclosure.

The mapping table 510 generally includes a logical address field and a physical address field.

In the present embodiment, the mapping table 510 includes an ID column and identification numbers of the in-storage programs are stored in the ID fields of the ID column.

For example, the storage security library 311 may store the identification number of an in-storage program in the ID field of the mapping table 510 by using the SetIDBits function in the API of Table 2.

For example, when the first in-storage program 321 accesses the mapping table 510 using a logical address, and the mapping table 510 entry corresponding to the logical address corresponds to the second in-storage program 322, the mapping table 510 may indicate an error and thus the storage device 100 may avoid providing a physical address corresponding to the logical address.

With this approach, it is possible to prevent an in-storage program from accessing a physical page of the flash chip 2 corresponding to another in-storage program.

Figure 7:
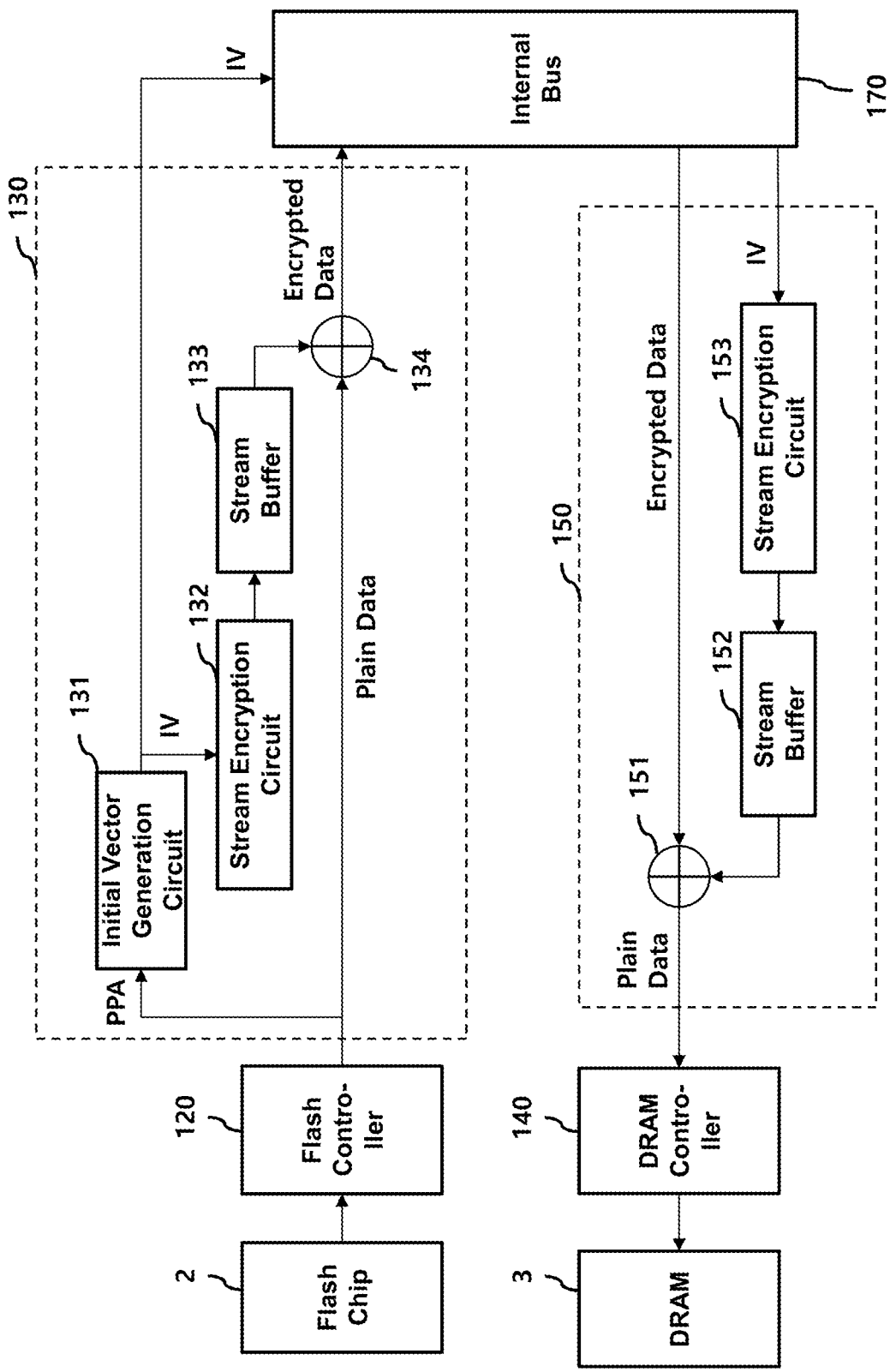
FIG. 7 illustrates a data encryption circuit and a data decryption circuit according to an embodiment of the present disclosure.

FIG. 7 illustrates a data encryption circuit 130 and a data decryption circuit 150 according to an embodiment of the present disclosure.

The data encryption circuit 130 encrypts data flowing out from the flash chip 2, and the data decryption circuit 150 decrypts that encrypted data and provides decrypted data to the DRAM chip 3.

Accordingly, the internal bus 160 may not leak plain data, because it transmits encrypted data instead of plain data.

In this embodiment, a stream-based encryption technique may be used instead of a block-based encryption technique. Nonetheless, underlying concepts of stream-based encryption may be readily extended to block-based encryption according to features of block-based encryption mentioned below and features known in the art.

Depending on implementation, stream-based encryption may have the following advantages over conventional block-based encryption.

First, stream-based encryption is not affected by the input/output bandwidth of the flash chip 2. On the other hand, since block-based encryption generally uses encryption units with the same size as the block size, there is a problem of requiring a complex circuit such as a pipeline structure or the like to achieve maximum throughput.

Second, stream-based encryption can be parallelized with the operation of reading a page in the flash chip 2, thereby hiding the time required for the encryption operation. In contrast, block-based encryption technology has a problem in that the encryption operation cannot be performed until one block of data is output, so that the overhead due to the encryption operation cannot be hidden (i.e., parallelized).

Third, with stream-based encryption, it is possible to efficiently generate pseudo-random numbers by accessing a large amount of data for an in-storage program. In contrast, with block-based encryption, there is a problem in that frequent delays occur between data access and encryption due to data buffering.

The data encryption circuit 130 includes an initialization vector generation circuit 131, a stream encryption circuit 132 and an operation circuit 134.

The initial vector (IV) generation circuit 131 generates an initial vector IV that varies depending on a page to be encrypted.

Figure 8:
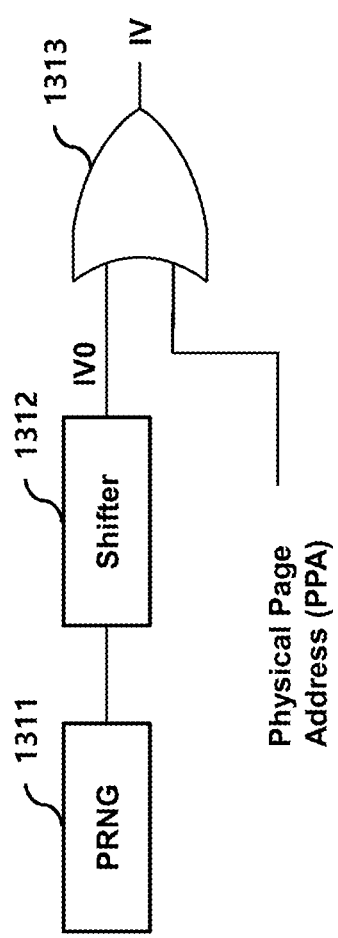
FIG. 8 illustrates an initial vector generation circuit according to an embodiment of the present disclosure.

As shown in FIG. 8, the IV generation circuit 131 generates a key vector IV0 using the pseudo-random number generation circuit 1311 and a shifter 1312.

The IV generation circuit 131 may generate the initial vector IV using the key vector IV0 and the physical page address PPA.

To this end, the OR operation circuit 1313 may perform an OR operation on the key vector IV0 and the physical page address PPA.

For example, if the key vector IV0 is 48 bits and the physical page address PPA is 32 bits, the initial vector IV has a total of 80 bits of data, where the upper 48 bits are the key vector IV0, and the lower 32 bits correspond to the physical page PPA.

Accordingly, different initial vectors may be generated depending on which page is to be encrypted.

The shifter 1312 may function as a register storing the key vector IV0 after completion.

Returning to FIG. 7, the initial vector IV is shared with the data decoding circuit 150 through the internal bus 170.

The stream encryption circuit 132 generates a key stream by receiving the initial vector IV.

For example, the stream encryption circuit 132 may generate 64 key streams per encryption cycle.

Since the stream encryption itself is well known (in contexts other than storage devices such as the instant storage device 1), a detailed description of the encryption operation of the stream encryption circuit 132 that generates a key stream according to the initial vector IV will be omitted.

The stream buffer 133 buffers the key stream generated by the stream encryption circuit 132.

The operation circuit 134 performs an XOR operation on (i) plain data, that is, original data provided through the flash controller 120, and (ii) a key stream provided from the stream buffer 133, thereby generating encrypted data stream.

In this case, the data encryption circuit 130 may buffer the plain data output from the flash controller 120 in units of pages and provide the buffered data to the operation circuit 134.

Accordingly, the encrypted data may be generated by using a different initial vector IV for each page.

The encrypted data and initialization vector are provided to the data decryption circuit 150 through the internal bus 160.

The data decryption circuit 150 has a similar configuration to the data encryption circuit 130 (excepting the initial vector generation circuit 131) and performs a decryption operation. The encryption circuits may implement any known symmetric encryption algorithm.

The data decryption circuit 150 includes an operation circuit 151, a stream buffer 152, and a stream encryption circuit 153.

The stream encryption circuit 153 generates a key stream by receiving the initial vector IV from the internal bus 170.

For example, the stream encryption circuit 153 may generate 64 key streams per encryption cycle.

The stream buffer 152 buffers a key stream generated by the stream encryption circuit 153.

The operation circuit 151 performs an XOR operation on (i) the encrypted data provided through the internal bus 170 and (ii) the key stream provided from the stream buffer 152, thereby generating a plain data stream.

The DRAM controller 140 stores the plain data in the DRAM chip 3.

As described above, when data is transmitted from the flash chip 2 to the DRAM chip 3, the data is transmitted in encrypted form instead of its original plain data form, thereby improving security performance.

The following embodiment may prevent leaking plain user data including original data, intermediate data, and result data during execution of the in-storage program by the processor 110.

In this embodiment, memory encryption and verification operations are performed using the memory security circuit 180, which may provide the above security benefits.

First, a memory encryption operation of the memory security circuit 180 is described.

Figure 9:
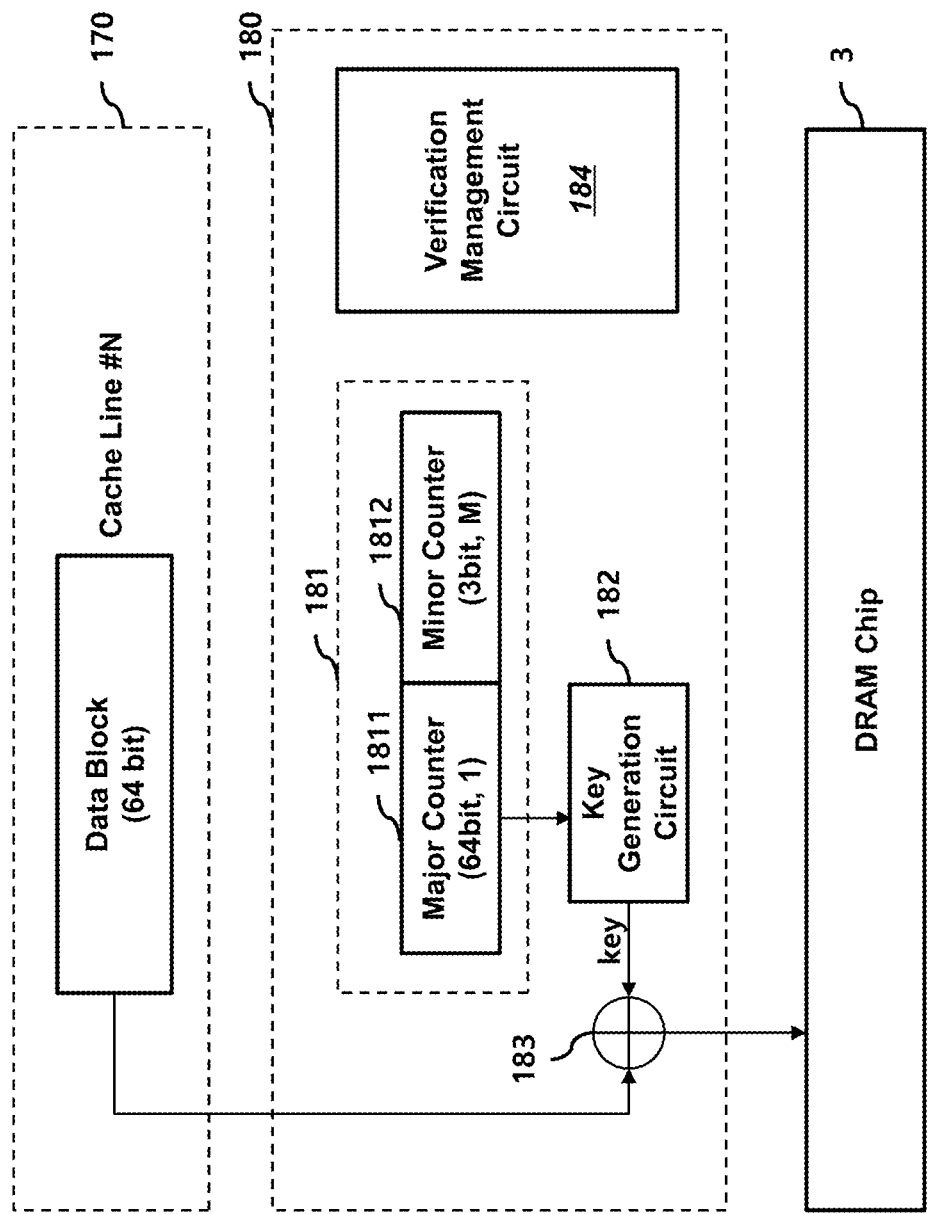
FIG. 9 illustrates a memory security circuit according to embodiments of the present disclosure.

FIG. 9 illustrates a memory security circuit 180 according to an embodiment of the present disclosure.

In this embodiment, the memory security circuit 180 encrypts data written back into the DRAM chip 3 after being evicted from the cache memory 170 And accordingly, the DRAM chip 3 stores encrypted data provided by the memory security circuit 180. This can minimize performance degradation due to data encryption.

Hereinafter, it is assumed that the cache line of the cache memory 170 includes a 64-bit data block, and data is encrypted in units of data blocks (for discussion, 64-bit data blocks are assumed, but other sizes may be used).

In this embodiment, a data block is encrypted by performing an XOR operation on the data block and a one-time password (OTP).

In order to secure temporal uniqueness, an OTP may be generated by encrypting a counter value whose value increases when performing a writeback operation according to an encryption algorithm such as Advanced Encryption Standard (AES).

In this embodiment, a counter block 181 is included to generate a counter value.

The counter block 181 includes a major counter 1811 and a minor counter 1812.

In this embodiment, the minor counter includes M 3-bit counters, and each 3-bit counter corresponds to a separate data block (sizes other than 3 may be used).

Assuming that one data block is included in one cache line, one counter block 181 corresponds to M cache lines.

The M cache lines may be referred to as one cache block, and the memory area corresponding to the M data blocks may be referred to as one memory block.

The counter block 181 may be included in the cache memory 170 or may be included in the memory security circuit 180 according to implementation. In the example of FIG. 9, the counter block 181 is included in the memory security circuit 180.

The memory security circuit 180 includes a key generation circuit 182 that generates a key by encrypting the value of the major counter 1811, and also includes an encryption circuit 183 that encrypts a key value and a data block. In this embodiment, the encryption circuit 183 may perform an XOR operation.

The encrypted data that is outputted from the encryption circuit 183 is stored in the DRAM chip 3 to improve the security of user data used during execution of an in-storage program.

In this embodiment, when the encrypted data is stored in the DRAM chip 3, a counter value corresponding to the encrypted data is stored in the DRAM chip 3 together with (or in association with) the encrypted data.

In this case, the address space for storing the counter value may be provided separately from the address space for storing data. Allocating an address space can be changed in various ways by a person skilled in the related art, and thus a detailed description thereof will be omitted.

When an overflow occurs in any one of the M 3-bit counters included in the minor counter 812, the value of the major counter 1811 increases, and the minor counter 1812, that is, all M 3-bit counters are initialized.

In this embodiment, when the value of the major counter 1811 increases, a new key is generated.

At this time, if the data encrypted using the existing key is stored in the DRAM chip 3, the encrypted data may be decrypted by performing an XOR operation with the existing key, and then may be encrypted again with a new key, and may be re-stored in the DRAM chip 3.

Hereinafter, a data verification operation performed by the memory security circuit 180 will be described.

The memory security circuit 180 includes a verification management circuit 184.

The verification management circuit 184 verifies whether the data output from the DRAM chip 3 is the same as the data stored by the processor 110 in the DRAM chip 3.

The verification management circuit 184 may be implemented by applying a known data structure such as a Merkle Tree or a Bonsai Merkle Tree (BMT).

Figure 10:
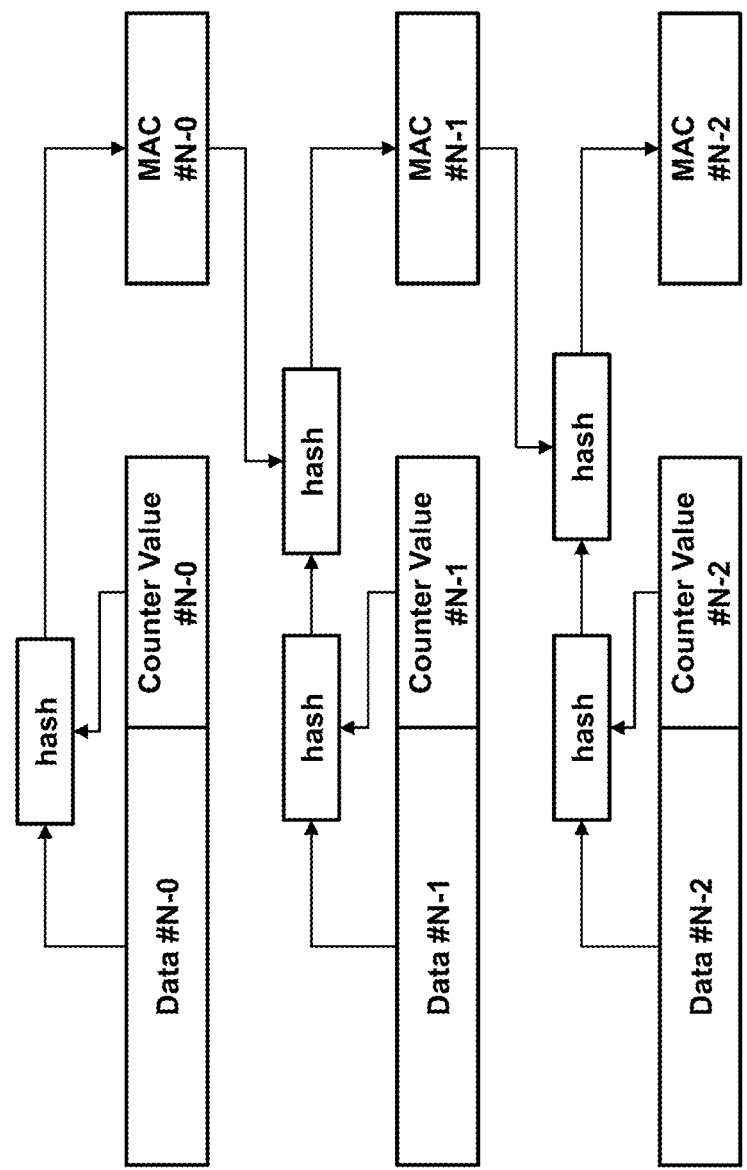
FIG. 10 illustrates verification data structure according to an embodiment of the present disclosure.

In this embodiment, the verification management circuit 184 manages the verification data structure in the form of a tree 400, for example, as shown in FIG. 10. Other types of data structures may be used.

When data is written back to the DRAM chip 3, the verification management circuit 184 updates the verification data structure.

In this embodiment, a message verification code (MAC) is generated by hashing data with a counter value used to encrypt the data.

Data verification can be performed by generating a MAC, hashing the encrypted data read from the DRAM chip 3 with a counter value corresponding to the encrypted data, and then comparing the generated MAC with the stored MAC.

As described above, in the present embodiment, since the counter value associated with the encrypted data is stored in the DRAM chip 3 together with the counter value, the counter value used to encrypt the outputted encrypted data can be read from the DRAM chip 3.

The verification management circuit 184 manages a MAC in a hierarchical structure such as the tree 400.

For example, if a second or subsequent writeback operation occurs for any one data block or if a new encryption operation occurs due to a key value update, a new MAC, for example MAC #N-1, may be generated.

The new MAC #N-1 is generated by hashing a first hash with a second hash.

The first hash is generated by hashing the new data block, for example, data #N-1, and a major counter value, for example, counter value #N-1.

The second hash corresponds to a previous MAC, for example, MAC #N-0, which is generated by hashing a previous data block, for example, data #N-0, and a major counter value, for example, counter value #N-0.

Thereafter, the above-described process is repeated to generate a MAC. Accordingly, a MAC corresponding to one data block may be managed in a tree-like form, which will be referred to as a verification data structure.

In FIG. 10, a newly generated MAC corresponding to a newly updated data block corresponds to a parent node in a tree structure, and a previously generated MAC corresponds to a child node in the tree structure.

By using this verification data structure, it is possible to verify the integrity of data corresponding to the child node using a MAC of the child node's parent node.

FIG. 10 shows a verification data structure corresponding to one data block, but the verification management circuit 184 may manage the verification data structure in a similar manner for all data blocks.

In addition, it may be possible to generate a single integrated verification data structure for all data blocks by applying a known data structure such as a BMT. Since the details of such a data structure may be variously changed by a person skilled in the art by referring to the conventional data structures, a detailed description thereof will be omitted.

Figure 11:
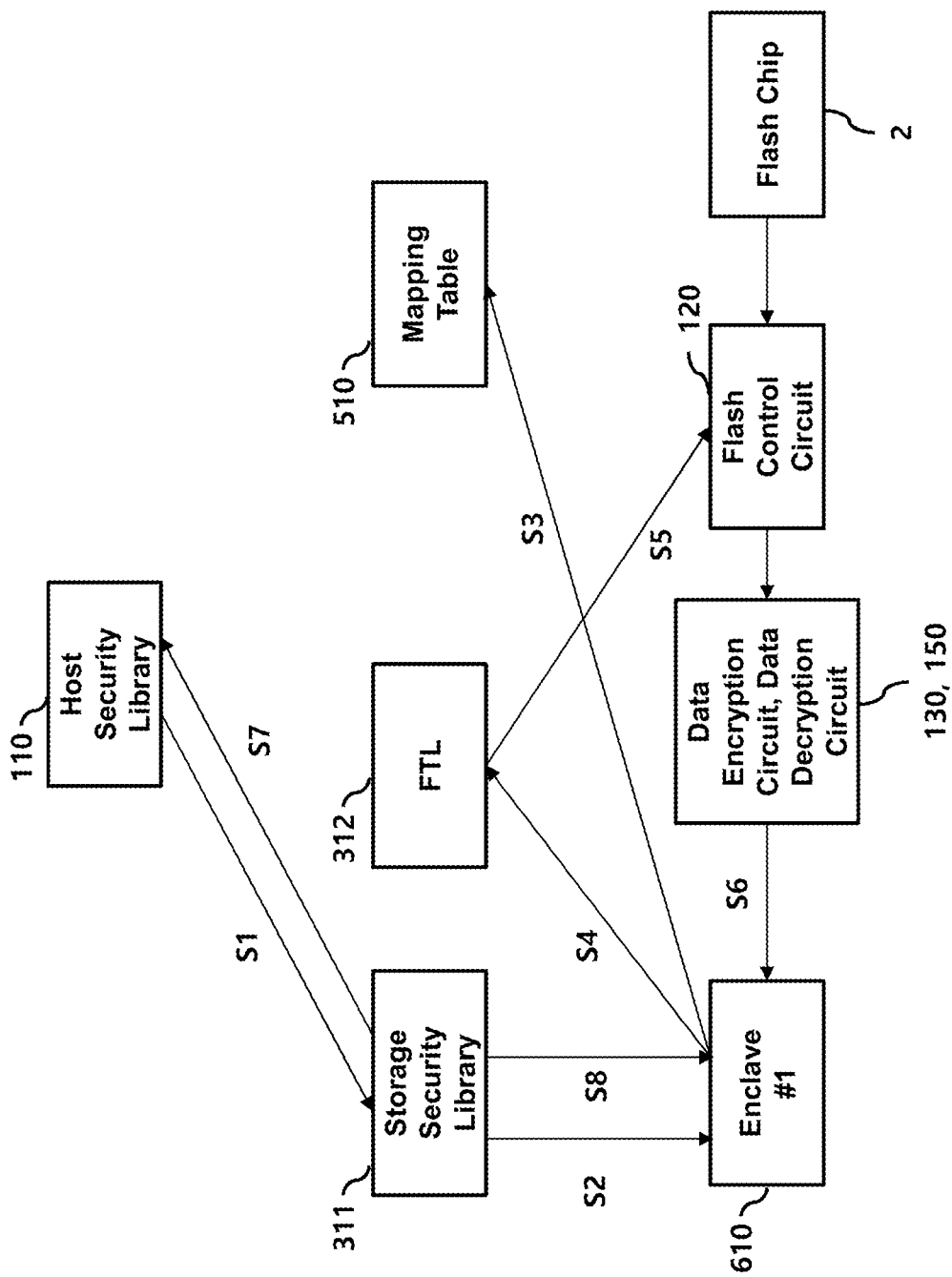
FIG. 11 illustrates an operation of a data storage device according to embodiments of the present disclosure.

FIG. 11 illustrates an overall operation of a data storage device according to an embodiment of the present disclosure.

Below, the operation is described with reference to the APIs disclosed in Tables 1 and 2.

First, at step S1, the application program 110 of the host 200 calls the OffloadCode function provided by the host security library 110.

The parameter "bin" parameter of the OffloadCode function (see Table 1) points to the in-storage program 321 compiled in advance, the "lpa" parameter points to a list of logical page addresses of data to be used by the in-storage program 321, and the "tid" parameter is an index value used by the host 200 to identify the relevant in-storage program 321.

At step S2, in response to the call of the OffloadCode function, the CreatEnclave API provided by the storage security library 311 of the data storage device 100 is called.

Through this, the metadata 410 corresponding to the in-storage program 321 is also stored in the security area 400, and the enclave 610 corresponding to the in-storage program 321 is allocated in the normal area 600.

At this time, the SetIDBits function in the API of the storage security library 311 is called.

Through this, information corresponding to the ID field of the corresponding entry in the mapping table 510 is set by referring to the logical address of the data used by the in-storage program 321.

In the present embodiment, at step S3, the in-storage program 321 may access the mapping table 510 and directly obtain a physical page address corresponding to the logical page address.

When the mapping table 510 of the DRAM chip 3 caches only some of the entries in the entire mapping table 510, an entry corresponding to a logical address required by the storage program 321 may not exist in the mapping table 510.

In this case, the in-storage program 321 associated with the enclave 610 may request the FTL 312 to provide the new address.

To this end, the ReadMappingEntry function in the API supported by the storage security library 311 may be called.

In response, the FTL 312 controls the flash control circuit 120 to read a corresponding physical page address corresponding to the requested logical page address and to update the information of the mapping table 510.

The page data is stored in the enclave 610 through the data encryption circuit 130 and the data decryption circuit 150.

In this case, the data encryption and decryption processes are as previously disclosed with reference to FIG. 7.

After the in-storage program 321 is installed in the enclave 610, the storage security library 310 calls the in-storage program 321.

Thereafter, the storage security library 310 monitors the state of the in-storage program 321, and as described above, monitors the access right to the memory area and the mapping table 510.

During the monitoring process, if a fault such as an access error occurs as described above, an exception can be thrown through the ThrowOutEnclave function and access can be blocked.

The storage security library 310 stores the execution result in the metadata 410 when execution of the storage program 321 is terminated.

At step S7, when the GetResult function in the host security library 110 is called, the storage security library 311 transmits the execution result to the host 200.

Thereafter, the storage security library 311 releases the resource allocation related to the enclave 610 by calling the TerminateEnclave function.

Although various embodiments have been illustrated and described, various changes and modifications may be made to the described embodiments without departing from the spirit and scope of the invention as defined by the following claims.

What is claimed is:

1. A data storage device comprising:
   a nonvolatile memory device;
   a volatile memory device;
   a data encryption circuit configured to produce encrypted data by encrypting data outputted from the nonvolatile memory device;
   a data decryption circuit configured to produce decrypted data by decrypting the encrypted data and configured to provide the decrypted data to the volatile memory device; and a processor configured to perform a first process that controls installation of a first in-storage program into the data storage device, a second process for configured to manage a mapping table storing a relation between a logical address and a physical address of the nonvolatile memory device, and a third process configured to execute the first in-storage program.

2. The data storage device of claim 1, wherein the volatile memory device includes a secure area configured to store metadata of the first in-storage program, a protected area configured to store the mapping table, and a normal area configured to store a first enclave allocated for the first in-storage program.

3. The data storage device of claim 1, wherein the first process prevents the third process from performing a write operation on the protected area according to permissions associated with the third process.

4. The data storage device of claim 2, wherein the first process controls installation of a second in-storage program, the normal area stores a second enclave allocated for the second in-storage program, and the processor performs a fourth process configured to execute the second in-storage program, wherein the first process prevents the third process from accessing the second enclave, and wherein plain data outputted from the enclaves is encrypted by the data encryption circuit and decrypted by the data decryption circuit.

5. The data storage device of claim 4, wherein the mapping table comprises entries, each entry including a corresponding logical address field, physical address field, and ID field, wherein the ID field stores information for identifying the first in-storage program and the second in-storage program.

6. The data storage device of claim 5, wherein the second process provides mapping information referring to the ID field when the third process reads the mapping table.

7. The data storage device of claim 1, wherein the data encryption circuit includes:
an initial vector generation circuit configured to generate an initial vector referring to a physical address of data output from the nonvolatile memory device;
a stream encryption circuit configured to generate an encrypted stream encrypted with the initial vector; and
an operation circuit configured to generate the encrypted data by using the data output from the nonvolatile memory device and the encrypted stream.

8. The data storage device of claim 7, further comprising a stream buffer configured to buffer the encrypted stream.

9. The data storage device of claim 7, wherein the initial vector generation circuit includes a pseudo-random number generator configured to generate a key vector, and a logical circuit configured to provide the initial vector by operating the key vector and the physical address.

10. The data storage device of claim 1, wherein the data decryption circuit includes:
a stream encryption circuit configured to generate an encrypted stream encrypted with an initial vector; and
an operation circuit configured to generate plain data by using the encrypted data and the encrypted stream.

11. The data storage device of claim 2, further comprising:
a cache memory configured to cache data of the first enclave; and
a memory security circuit configured to encrypt data evicted from the cache memory to be written back to the first enclave.

12. The data storage device of claim 11, wherein the memory security circuit includes:
a key generation circuit configured to generate a key value from a counter value generated according to a writeback operation of the data storage device; and
an encryption circuit configured to generate an encrypted data block according to data block of the cache memory and the key value.

13. The data storage device of claim 12, further comprising a counter block including a major counter and a minor counter,
wherein the minor counter increases according to the writeback operation and the major counter updates when overflow occurs at the minor counter, and
wherein the counter value is provided from the major counter.

14. The data storage device of claim 12, wherein the memory security circuit includes a verification management circuit configured to verify integrity of a data block outputted from the first enclave.

15. The data storage device of claim 11, wherein the verification management circuit generates a first message authentication code (MAC) by hashing the data block with the counter value when the data block is written back to the first enclave, and generates or updates a verification data structure using the first MAC.

16. The data storage device of claim 15, wherein when update data for updating the data block is stored in the first enclave, the verification management circuit generates a second MAC by hashing the first MAC with a result of hashing the update data block and a counter value used for encrypting the update data block, and updates the verification data structure so that the second MAC is related to the first MAC.

17. The data storage device of claim 1, further comprising an internal bus for transmitting data between the data encryption circuit and the data decryption circuit, and an interface coupled to the internal bus.

18. A method performed by a data storage device in communication with a host computing device, the data storage device comprising a flash chip, a dynamic random access memory (DRAM) chip, an encryption circuit, an internal bus, a processor, and a decryption circuit, the method performed by the processor and comprising:
executing an in-storage program stored in the data storage device, the in-storage program having plain data stored in the flash chip;
when execution of the in-storage program causes the plain data to be stored in the DRAM chip, as the plain data flows out of the flash chip, encrypting, by the encryption circuit, the plain data to produce corresponding encrypted data;
transferring, via the internal bus, the encrypted data from the encryption circuit to the decryption circuit;
decrypting, by the decryption circuit, the encrypted data to reproduce the plain data; and
storing the plain data in the DRAM chip.

* * * * *